US008538756B2

(12) United States Patent
Fujii et al.

(10) Patent No.: US 8,538,756 B2
(45) Date of Patent: Sep. 17, 2013

(54) IN-VEHICLE DEVICE AND METHOD FOR MODIFYING DISPLAY MODE OF ICON INDICATED ON THE SAME

(75) Inventors: Masahiro Fujii, Obu (JP); Yuji Shinkai, Novi, MI (US)

(73) Assignee: DENSO CORPORATION, Kariya (JP)

( * ) Notice: Subject to any disclaimer, the term of this patent is extended or adjusted under 35 U.S.C. 154(b) by 172 days.

(21) Appl. No.: 12/987,350

(22) Filed: Jan. 10, 2011

(65) Prior Publication Data

US 2011/0173002 A1 Jul. 14, 2011

(30) Foreign Application Priority Data

Jan. 12, 2010 (JP) .................................... 2010-3879

(51) Int. Cl.
*G10L 19/00* (2013.01)
(52) U.S. Cl.
USPC .......................................... 704/246; 704/275
(58) Field of Classification Search
USPC .......................................................... 704/275
See application file for complete search history.

(56) References Cited

U.S. PATENT DOCUMENTS

| | | | | | |
|---|---|---|---|---|---|
| 1,298,735 | A | * | 4/1919 | Kovar | 172/639 |
| 5,274,560 | A | * | 12/1993 | LaRue | 701/533 |
| 5,724,644 | A | * | 3/1998 | Wassink et al. | 340/7.51 |
| 5,864,815 | A | * | 1/1999 | Rozak et al. | 704/275 |
| 5,999,895 | A | * | 12/1999 | Forest | 704/1 |
| 6,330,497 | B1 | * | 12/2001 | Obradovich et al. | 701/1 |
| 6,477,499 | B1 | * | 11/2002 | Yasuda | 704/275 |
| 7,481,360 | B1 | * | 1/2009 | Ramachandran et al. | 235/379 |
| 2002/0178009 | A1 | * | 11/2002 | Firman | 704/275 |
| 2004/0111270 | A1 | * | 6/2004 | Whitham | 704/275 |
| 2005/0125233 | A1 | * | 6/2005 | Matsubara et al. | 704/275 |
| 2005/0138574 | A1 | * | 6/2005 | Lin | 715/811 |
| 2007/0159361 | A1 | * | 7/2007 | Hirayama | 340/995.1 |
| 2007/0279316 | A1 | * | 12/2007 | Daude et al. | 345/2.1 |
| 2008/0168398 | A1 | * | 7/2008 | Geelen et al. | 715/854 |
| 2008/0279161 | A1 | * | 11/2008 | Stirbu et al. | 370/338 |
| 2009/0241171 | A1 | * | 9/2009 | Sunwoo et al. | 726/3 |
| 2009/0282371 | A1 | * | 11/2009 | Curl | 715/863 |
| 2010/0009719 | A1 | * | 1/2010 | Oh et al. | 455/563 |
| 2010/0153111 | A1 | * | 6/2010 | Hirai et al. | 704/251 |
| 2010/0265053 | A1 | * | 10/2010 | Yamamoto et al. | 340/441 |
| 2011/0173002 | A1 | * | 7/2011 | Fujii et al. | 704/246 |
| 2012/0001843 | A1 | * | 1/2012 | Gravino | 345/156 |

(Continued)

FOREIGN PATENT DOCUMENTS

JP H05-158618 A 6/1993
JP A-H05-265689 10/1993

(Continued)

OTHER PUBLICATIONS

Office Action mailed Mar. 26, 2013 in corresponding JP Application No. 2010-003879 (and English translation).

*Primary Examiner* — Jialong He
*Assistant Examiner* — Jie Shan
(74) *Attorney, Agent, or Firm* — Posz Law Group, PLC

(57) ABSTRACT

A storage unit stores a correspondence between a voice command and a display mode modification operation. When a control unit determines that a vehicle is traveling according to a traveling state of the vehicle obtained by a traveling state acquisition unit, when a voice recognition unit recognizes a voice, which is uttered by a user and received by a voice input unit, and when the control unit determines that the recognized voice corresponds to a voice command stored in the storage unit, the control unit performs a display mode change operation corresponding to the voice command and modifies a display mode of an icon indicated on an indication screen of an indication unit.

19 Claims, 4 Drawing Sheets

(56) References Cited

U.S. PATENT DOCUMENTS

2012/0191461 A1 * 7/2012 Lin et al. .................. 704/275

FOREIGN PATENT DOCUMENTS

| | | |
|---|---|---|
| JP | A-H09-016891 | 1/1997 |
| JP | A-H09-237151 | 9/1997 |
| JP | 2002-340601 A | 11/2002 |
| JP | 2003-195891 A | 7/2003 |
| JP | 2004-333319 A | 11/2004 |
| JP | 2005-031260 A | 2/2005 |
| JP | A-2005-189846 | 7/2005 |
| JP | 2009-026239 A | 2/2009 |
| WO | WO 2007/069573 | 6/2007 |

* cited by examiner

FIG. 2

| VOICE COMMAND | DISPLAY MODE MODIFICATION OPERATION |
|---|---|
| UPWARD | MOVE ICON UPWARD BY PIXELS |
| DOWNWARD | MOVE ICON DOWNWARD BY PIXELS |
| LEFTWARD | MOVE ICON LEFTWARD BY PIXELS |
| RIGHTWARD | MOVE ICON RIGHTWARD BY PIXELS |
| ENLARGE | ENLARGE ICON BY PIXELS |
| CONTRACT | CONTRACT ICON BY PIXELS |
| DARKEN | DARKEN ICON BY TONES |
| LIGHTEN | LIGHTEN ICON BY TONES |
| ERASE | ERASE ICON |
| INDICATE | INDICATE ICON |
| ⋮ | ⋮ |

FIG. 4A NORMAL SATE
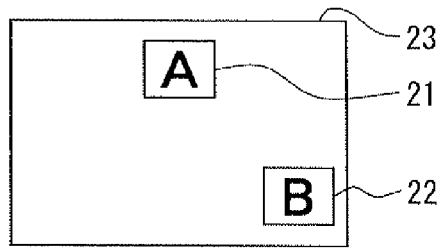
FIG. 4B MODIFY DISPLAY POSITION
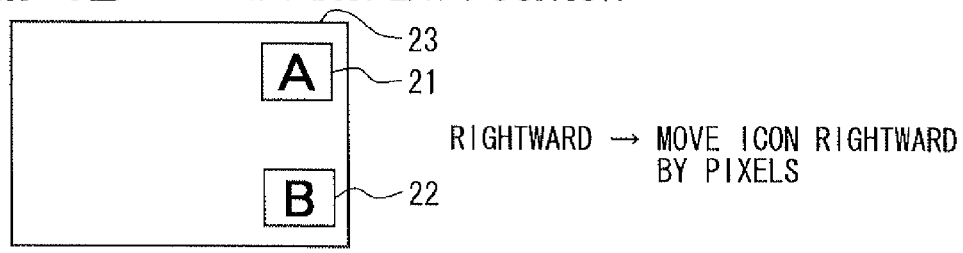
RIGHTWARD → MOVE ICON RIGHTWARD BY PIXELS
FIG. 4C MODIFY DISPLAY SIZE
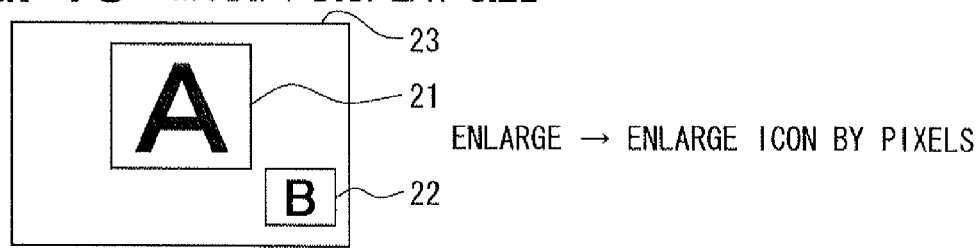
ENLARGE → ENLARGE ICON BY PIXELS
FIG. 4D MODIFY DISPLAY CONTRAST
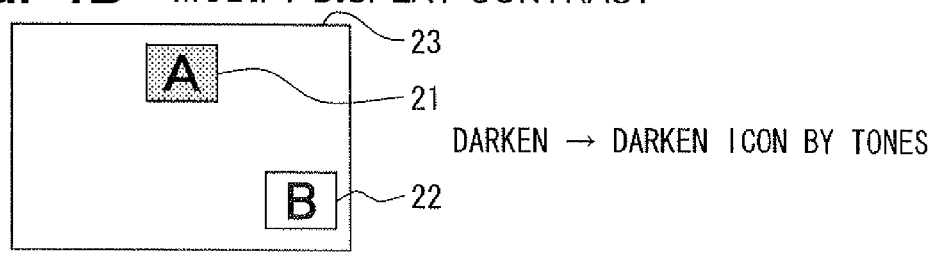
DARKEN → DARKEN ICON BY TONES
FIG. 4E MODIFY PERMISSION OF INDICATION
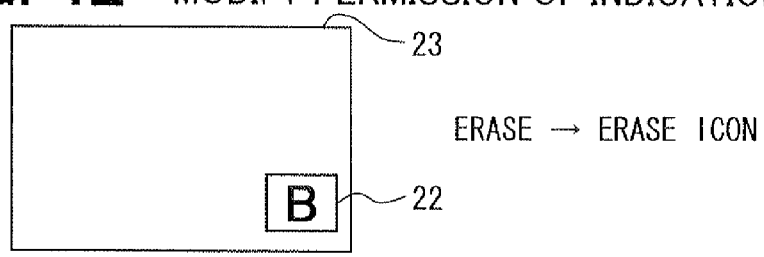
ERASE → ERASE ICON

IN-VEHICLE DEVICE AND METHOD FOR MODIFYING DISPLAY MODE OF ICON INDICATED ON THE SAME

CROSS REFERENCE TO RELATED APPLICATIONS

This application is based on and incorporates herein by reference Japanese Patent Application No. 2010-3879 filed on Jan. 12, 2010.

FIELD OF THE INVENTION

The present invention relates to an in-vehicle device including an indication unit configured to indicate an icon corresponding to a gadget on an indication screen of a display unit and a control unit configured to modify a display mode of an icon indicated on the indication screen. The present invention further relates to a method for modifying a display mode of an icon corresponding to a gadget indicated on the indication screen.

BACKGROUND OF THE INVENTION

For example, JP-A-2009-26239 discloses a configuration to indicate an icon corresponding to a gadget on an indication screen of an information processing device such as a personal computer. The icon is, for example, a simplified image formed of pixels in a predetermined size to represent a content of the gadget. In this configuration, a user can start a gadget to activate a function corresponding to the gadget and execute a program corresponding to the gadget by manipulating an icon indicated on the indication screen. The gadget is a small-scale program, which enables a user to access a frequently used software tool (program) easily. The gadget is also called a widget.

In recent years, a graphical user interface (GUI) for an in-vehicle device has been quickly developed. In consideration of quick development of such a GUI, an in-vehicle device equipped to a vehicle may have a function to indicate an icon corresponding to a gadget. In general, a user may desire to arbitrary modify a display mode of an icon, such as a display position, a display size, an indication contrast, an indication permission, and/or the like, so as to, for example, enhance visibility of a frequently-used icon compared with other icons. It is assumed that a user may modify a display mode of an icon by, for example, newly forming an operation key such as a move key, an enlarge key, and a contract key operable as a touch key on an indication screen. Alternatively, a user may modify a display mode of an icon by assigning a similar function to a hard key. Thus, the user is enabled to modify a display position of an icon by manipulating such a move key. In addition, the user is enabled to modify a display size of an icon by manipulating such an enlarge key and a contract key.

In such a configuration, when a vehicle is stopping, there is no problem for a user to manipulate an operation key so as to modify a display mode of an icon. On the other hand, when a vehicle is traveling, safety of driving the vehicle may be spoiled, since a user needs to move an eye sight from a traveling direction so as to look for an operation key to manipulate the operation key or the user may need to gaze at an indication screen, for example.

SUMMARY OF THE INVENTION

In view of the foregoing and other problems, it is an object of the present invention to produce an in-vehicle device configured to enable a user to modify a display mode of an icon without spoiling safety even when a vehicle is traveling. It is another object of the present invention to produce a method for modifying a display mode of an icon corresponding to a gadget indicated on the indication screen.

According to one aspect of the present invention, an in-vehicle device configured to be equipped to a vehicle, the in-vehicle device comprises of an indication unit having an indication screen and configured to indicate an icon corresponding to a gadget on the indication screen. The in-vehicle device further comprises of a traveling state acquisition unit configured to obtain a traveling state of the vehicle. The in-vehicle device further comprises of a voice input unit configured to receive a voice uttered by a user. The in-vehicle device further comprises of a voice recognition unit configured to recognize a voice uttered by a user and received by the voice input unit. The in-vehicle device further comprises of a storage unit configured to store a correspondence between a voice command and a display mode modification operation. The in-vehicle device further comprises of a control unit configured to perform a display mode modification operation, which is stored in the storage unit and corresponding to a voice command to modify a display mode of an icon indicated on the indication screen when: i) the control unit determines that the vehicle is traveling, according to a traveling state of the vehicle obtained by the traveling state acquisition unit, ii) the voice recognition unit recognizes a voice, which is uttered by a user and received by the voice input unit; and iii) the control unit determines that the recognized voice corresponds to the voice command stored in the storage unit.

According to one aspect of the present invention, a method for modifying a display mode of an icon corresponding to a gadget indicated on an indication screen, the method comprises of obtaining a traveling state of a vehicle. The method further comprises of receiving a voice uttered by a user using a voice input unit. The method further comprises of recognizing a voice received by the voice input unit using a voice recognition unit. The method further comprises of first determining whether the vehicle is traveling according to the obtained traveling state of the vehicle. The method further comprises of second determining whether the voice recognition unit recognizes a voice received by the voice input unit. The method further comprises of third determining whether the recognized voice corresponds to a voice command stored in a storage unit. The method further comprises of performing a display mode modification operation, which is stored in the storage unit to correspond to the voice command, to modify a display mode of an icon indicated on the indication screen when all the first determining, the second determining, and the third determining make positive determinations.

BRIEF DESCRIPTION OF THE DRAWINGS

The above and other objects, features and advantages of the present invention will become more apparent from the following detailed description made with reference to the accompanying drawings. In the drawings:

FIG. 2 is a view showing a corresponding between voice commands and display mode modification operations;

FIGS. 4A to 4E are schematic views each showing an indication mode of an icon corresponding to a gadget.

DETAILED DESCRIPTION OF PREFERRED EMBODIMENTS

Figure 1:
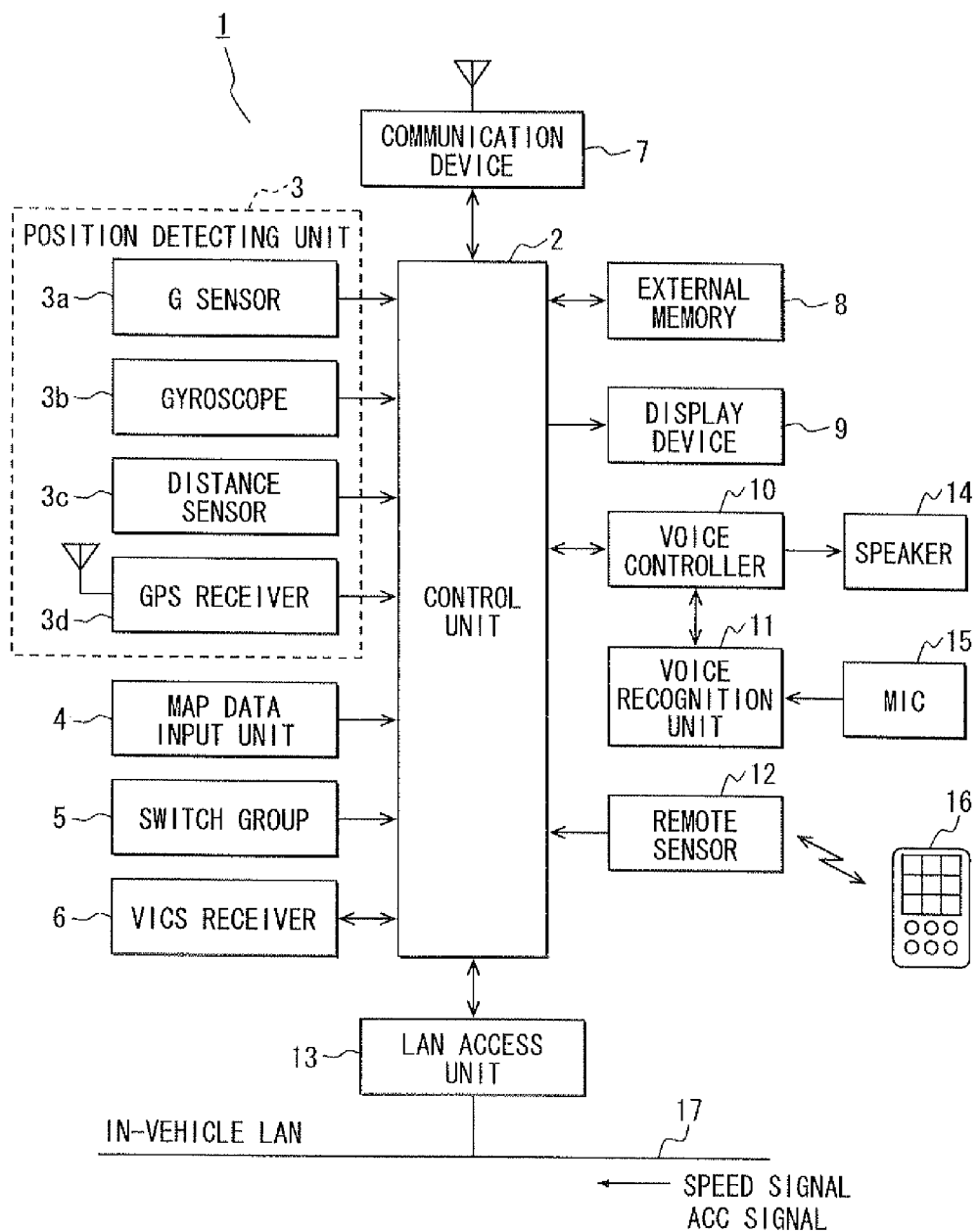
FIG. 1 is a functional block diagram showing an in-vehicle device according to an embodiment of the present invention.

As follows, an embodiment of an in-vehicle device applied to an in-vehicle navigation device will be described with reference to drawings. FIG. 1 is a block diagram showing an overview of the in-vehicle navigation device. An in-vehicle navigation device 1 includes a control unit 2 (control unit, storage unit), a position detection unit 3, a map data input unit 4, and an operation switch group 5 (operation receiving unit). The in-vehicle navigation device 1 further includes a VICS (registered trademark) receiver, a communication device 7, an external memory 8, a display device 9 (indication unit), a voice controller 10, a voice recognition unit 11 (voice recognition unit), a remote controller sensor 12, and an in-vehicle LAN access unit 13 (traveling state acquisition unit).

The control unit 2 includes a CPU, a RAM, a ROM, and an I/O bus and controls an operation of the in-vehicle device by executing a control program. The position detection unit 3 includes a G sensor 3a, a gyroscope 3b, a distance sensor 3c, and a GPS receiver 3d. Each of the sensors and components of the position detection unit 3 has a detection error characteristic different from each other. The control unit 2 receives detection signals outputted from the sensors and components of the position detection unit 3 and complements the detection signals each other to detect (specify) the current position of the vehicle. It is noted that the position detection unit 3 need not have all the sensors and components. The position detection unit 3 may include part of the sensors and components, as long as being capable of detecting the current position of the vehicle with a required detection accuracy. The position detection unit 3 may further include at least one or a combination of a steering wheel sensor for detecting a, steering angle of a steering wheel and a wheel sensor for detecting rotation of a wheel.

The map data input unit 4 includes a storage medium such as a CD-ROM, a DVD-ROM, a memory card, or an HDD for storing map data, map matching data, and the like. The operation switch group 5 includes a mechanical key located around the display device 9 and a touch key formed on an indication screen of the display device 9, for example. The operation switch group 5 outputs an operation detection signal to the control unit 2 on detection of an operation of a user, for example. The operation of a user is, for example, an instruction to select of a menu indication, an instruction to set a destination, an instruction to search a route, an instruction to start route guidance, an instruction to change indication screen, an instruction to control a sound volume, and the like.

A VICS receiver 6 performs broadband communications through a wide area network and receives VICS information from a VICS center device (not shown) through the wide area network. The communication device 7 performs broadband communications through the wide area network and receives a gadget from a server (not shown) through the wide area network. The gadget is a small-scale program, which enables a user to access a frequently used software tool (program) easily. The gadget is also called a widget. The external memory 8 is, for example, a mass storage device such as an HDD. The external memory 8 stores a gadget received as one item of various information items by the communication device 7 from the server through the wide area network.

The display device 9 is, for example, a color LCD device and configured to indicate various screens such as a menu selection screen, a destination set screen, a route guidance screen, and the like. The display device 9 is further configured to superimpose a current position mark representing the current position of the vehicle, a travel locus, and the like on a map specified by the map data. The display device 9 may be an organic electroluminescence (EL) device, a plasma display device, or the like.

The voice controller 10 causes a speaker 14 to output various sounds such as an alarm, a guidance voice for route guidance, and the like. The voice recognition unit 11 is controlled by the control unit 2. The voice recognition unit 11 has a voice-recognition algorithm to perform voice recognition of a voice inputted from a microphone 15 (voice input unit) when being activated. The remote controller sensor 12 is configured to receive an operation signal from a operation remote controller 16 and transmit an operation signal to the control unit 2 when receiving the operation signal. The in-vehicle LAN access unit 13 has an interface function with an in-vehicle LAN 17. The in-vehicle LAN access unit 13 inputs various signals such as a vehicle speed signal corresponding to a vehicle speed pulse outputted from the vehicle speed sensor (not shown) of the vehicle and an ACC signal outputted from an accessory (ACC) switch device through the in-vehicle LAN 17. The in-vehicle LAN access unit 13 outputs inputted various signals such as the vehicle speed signal and the ACC signal to the control unit 2.

The control unit 2 stores, for example, the Adobe Flash Player, which is a program for indicating a Small Wide Format (Shockwave Format: SWF) file compatible to the Flash platform (registered trademark) of Adobe Systems. The control unit 2 activates the stored Flash Player to cause the indication screen of the display device 9 to indicate an icon corresponding to a gadget stored in the external memory 8. When indicating an icon corresponding to a gadget on the indication screen of the display device 9, the control unit 2 causes the currently indicated icon to function as a touch key. On detection that a user operates the icon, the control unit 2 complexly determines an operation position of the icon, an operation time of the icon, and the number of operations of the icon based on an operation detection signal from the operation switch group 5. Thereby, the control unit 2 determines whether the present operation of the user to the icon is to activate a gadget (gadget starting operation), to activate a function or execute a program corresponding to the gadget, or to change a display mode of the icon (display mode modification operation).

Specifically, it is supposed that the control unit 2 determines that the user touches a center portion of the icon only once to perform a touch operation and determines that a time period for which the user touches the center portion of the icon is less than a predetermined period such as several seconds. In this case, the control unit 2 determines that the operation of the user to the icon is to activate a gadget and activates a gadget corresponding to the icon. On the other hand, it is supposed that the control unit 2 determines that a user traces (drags) from one end of the icon to the other end of the icon to perform a drag operation and determines that a time period for which the user traces from the one end of the icon to the other end of the icon is greater than or equal to a predetermined period such as several seconds. In this case, the control unit 2 determines that the operation of the user to the icon is to change a display mode of the icon and performs an operation described later.

The control unit 2 includes individual function units such as a map data acquisition unit, a map matching unit, a route searching unit, a route guidance unit, a graphic unit, and the like. The map data acquisition unit is for obtaining the map data. The map matching unit is for specifying a road where the current position of the vehicle exists based on the current position of the vehicle and road data included in the map data obtained by the map data acquisition unit. The route searching unit is for searching a path from the current position of the vehicle specified by the map matching unit to a destination set by a user. The route guidance unit is for calculating a point needed for route guidance according to the path searched by the route searching unit, the road data and position data of an intersection included in the map data and performing route guidance. The graphic unit is for drawing a map around the current position of the vehicle, a schematic illustration of a highway, an enlarged image around an intersection, and the like.

In the present embodiment, as shown in FIG. 2, the control unit 2 stores a correspondence table for a display mode modification operation. The correspondence table represents a correspondence between a voice command for changing a display mode of an icon and a corresponding display mode modification operation. When the microphone 15 inputs a voice uttered by a user and when the voice recognition unit 11 recognizes the uttered voice, the control unit 2 determines whether the voice uttered by the user corresponds to (matches) a voice command defined by the correspondence table with reference to the correspondence table for a display mode modification operation. When the control unit 2 determines that the voice uttered by the user corresponds to a voice command defined by the correspondence table, the control unit 2 performs a display mode modification operation corresponding to the voice command. A display mode modification operation is performed to change a display mode of an icon. The display mode includes, for example, a display position, a display size, an indication contrast, an indication permission, and the like. The correspondence between the voice commands and display mode modification operations shown in FIG. 2 is one example and may be arbitrary defined by a voice command and a display mode modification operation other than those in FIG. 2.

In FIG. 2, a voice command of "upward" corresponds to a display mode modification operation to move the display position of an icon upward by a predetermined pixel. A voice command of "downward" corresponds to a display mode modification operation to move the display position of an icon downward by a predetermined pixel. A voice command of "leftward" corresponds to a display mode modification operation to move the display position of an icon leftward by a predetermined pixel. A voice command of "rightward" corresponds to a display mode modification operation to move the display position of an icon rightward by a predetermined pixel. A voice command of "enlarge" corresponds to a display mode modification operation to enlarge the display size of an icon by a predetermined pixel. A voice command of "contract" corresponds to a display mode modification operation to contract the display size of an icon by a predetermined pixel. A voice command of "darken" corresponds to a display mode modification operation to darken the contrast of an icon by a predetermined tone. A voice command of "lighten" corresponds to a display mode modification operation to lighten the contrast of an icon by a predetermined tone. A voice command of "erase" corresponds to a display mode modification operation to erase an icon. A voice command of "indicate" corresponds to a display mode modification operation to indicate an icon.

The control unit 2 further stores a generally known correspondence table for setting a destination in addition to the correspondence table between the voice commands and the display mode modification operations. When the microphone 15 inputs a voice uttered by a user and when the voice recognition unit 11 recognizes the uttered voice, the control unit 2 determines whether the voice uttered by the user corresponds to a voice command defined by the correspondence table with reference to the correspondence table for a destination set operation. When the control unit 2 determines that the voice uttered by the user corresponds to a voice command defined by the correspondence table, the control unit 2 performs the destination set operation corresponding to the voice command.

Figure 3:
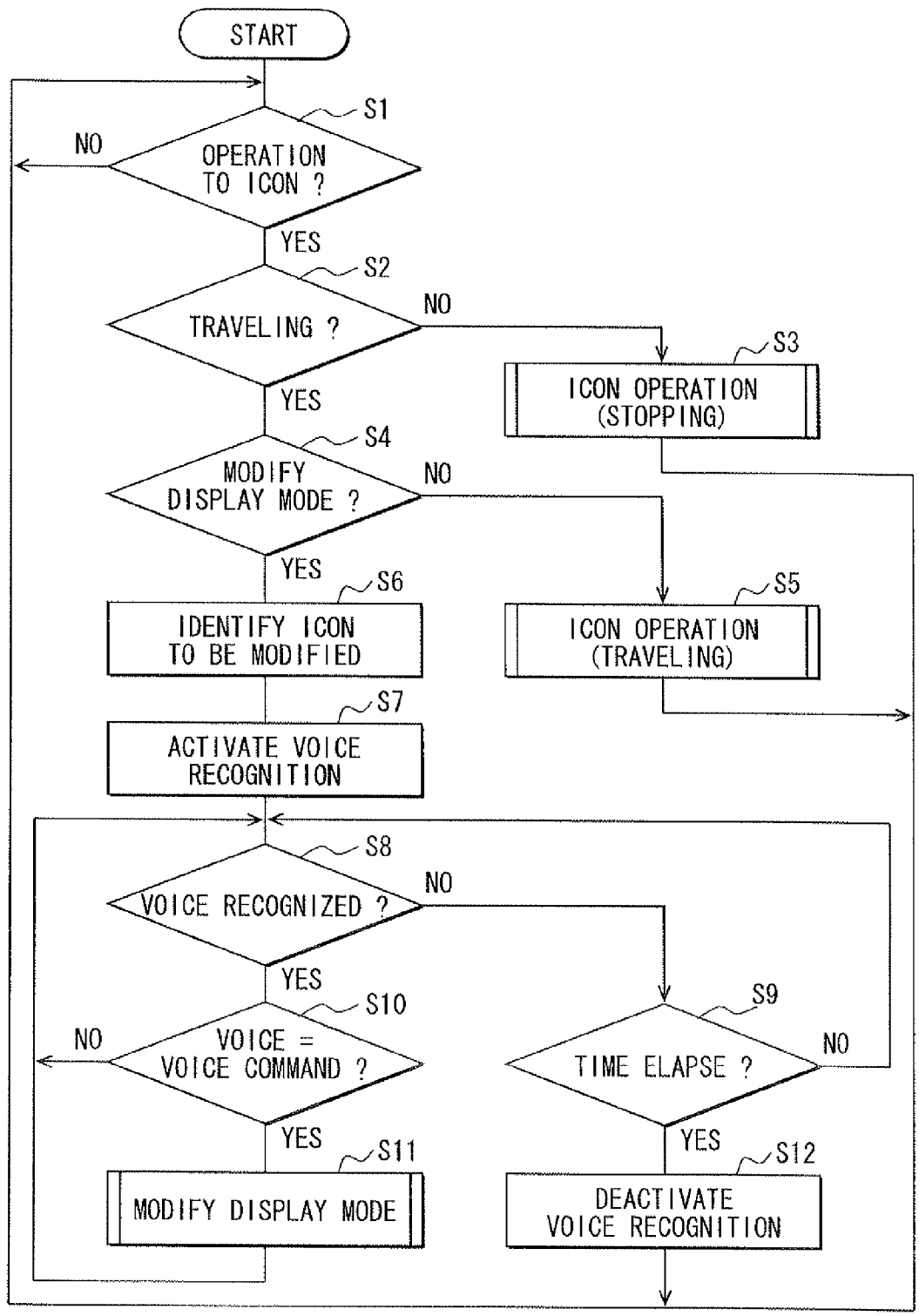
FIG. 3 is a flowchart showing an operation of a control unit of the in-vehicle device.

As follows, an operation of the above-described configuration will be described with reference to FIGS. 3 to 4. FIG. 3 is a flow chart showing an operation of the control unit 2. The control unit 2 determines whether the ACC switch device is activated according to the ACC signal inputted to the in-vehicle LAN access unit 13 through the in-vehicle LAN 17, for example. When the control unit 2 determines that the ACC switch device is activated, the control unit 2 activates (turns ON) the in-vehicle navigation device 1. In addition, the control unit 2 causes the indication screen of the display device 9 to indicate a start screen (initial screen) beforehand customized by a user. Subsequently, the control unit 2 indicates an icon corresponding to a gadget on the indication screen of the display device 9 and monitors (determines) whether a user performs a certain operation to the icon (step S1).

When the control unit 2 determines that the user performs the certain operation to the icon according to the operation detection signal inputted from the operation switch group 5, step S1 makes a positive determination (YES). In this case, the control unit 2 determines whether the vehicle is traveling (running) according to the vehicle speed signal inputted from the vehicle speed sensor to the in-vehicle LAN access unit 13 through the in-vehicle LAN 17 (step S2).

When the control unit 2 determines that the vehicle is not traveling, step S2 makes a negative determination (NO). In this case, the control unit 2 performs an operation, which is beforehand assigned to be performed when the vehicle stops, according to the operation performed by the user to the icon (step S3). Thus, the processing returns to step S1. Alternatively, when the control unit 2 determines that the vehicle is traveling, step S2 makes a positive determination (YES). In this case, the control unit 2 determines whether the operation performed by the user to the icon is an operation to change a display mode of the icon (step S4).

When the control unit 2 determines that the operation performed by the user to the icon is not to change the display mode of the icon, step S4 makes a negative determination (NO). That is, when the control unit 2 determines that the operation performed by the user to the icon is different from an operation to change the display mode of the icon, step S4 makes a negative determination (NO). In this case, the control unit 2 performs an operation beforehand assigned to be performed when the vehicle is traveling, according to the operation performed by the user to the icon (step S5). Thus, the processing returns to step S1. Specifically, the control unit 2 determines whether that the user touches a center portion of the icon only once and determines whether a time period for which the user touches the center portion of the icon is less than a predetermined period, for example. In this case, when the control unit 2 makes positive determinations (YES), the control unit 2 determines that the operation performed by the user to the icon is to activate a gadget. Further, the control unit 2 activates the gadget when activation of the gadget is not limited (prohibited) while the vehicle is traveling.

Alternatively, when the control unit 2 determines that the operation performed by the user to the icon is to change the display mode of the icon, step S4 makes a positive determination (YES). In this case, the control unit 2 identifies (selects) the icon as an object, the display mode of which is to be modified (step S6). Further, the control unit 2 activates the voice recognition unit 11 to enable voice recognition (step S7). Specifically, the control unit 2 determines whether the user traces from the one end of the icon to the other end of the icon and determines whether a time period for which the user traces from the one end of the icon to the other end of the icon is greater than or equal to a predetermined period, for example. In this case, when the control unit 2 makes positive determinations (YES), the control unit 2 determines that the operation performed by the user to the icon is to change the display mode of the icon. In this case, the control unit 2 identifies the icon as an object, the display mode of which is to be changed. Further, the control unit 2 activates the voice recognition unit 11 to enable voice recognition. Subsequently, the control unit 2 determines whether the microphone 15 receives a voice uttered by the user thereafter and whether the voice recognition unit 11 successfully recognizes the voice received by the microphone 15 (step S8). When step S8 makes a negative determination (NO), the control unit 2 determines whether the voice recognition unit 11 cannot recognize the voice continually for a predetermined period such as several seconds (step S9).

Subsequently, when the control unit 2 determines that the voice recognition unit 11 successfully recognizes the voice uttered from the user to the microphone 15, step S8 makes a positive determination (YES). In this case, the control unit 2 determines whether the voice uttered by the user corresponds to a voice command included in the correspondence table, according to a recognition result of the voice recognition (step S10). Subsequently, when the control unit 2 determines that the voice uttered by the user corresponds to a voice command included in the correspondence table, step S10 makes a positive determination (YES). In this case, the control unit 2 performs a display mode modification operation corresponding to the voice command (step S11). Thus, the present processing returns to steps S8 and S9. Alternatively, when the control unit 2 determines that the voice uttered by the user does not correspond to a voice command included in the correspondence table, step S10 makes a negative determination (NO). In this case, the present processing returns to steps S8 and S9. When the control unit 2 determines that the voice recognition unit 11 is incapable of recognizing the voice continually for a predetermined period, step S9 makes a positive determination (YES). In this case, the control unit 2 deactivates the voice recognition unit 11 to be incapable of voice recognition (step S12). Thus, the present processing returns to step S1.

As follows, some examples of changing of a display mode of an icon corresponding to a gadget by performing the operation of the control unit 2 will be described with reference to FIG. 4. In this example, the control unit 2 is in a normal state (FIG. 4A) where a user can customize an icon and causing an indication screen 23 to indicate an icon 21 corresponding to a gadget A and an icon 22 corresponding to a gadget B.

The control unit 2 determines whether a user performs a certain operation to the icon 21, determines whether the vehicle is traveling, and determines whether an operation performed by the user to the icon 21 is to change the display mode of the icon 21, when being in a normal state in which the user can customize an icon. In this case, when the control unit 2 makes positive determines, the control unit 2 activates the voice recognition unit 11 and determines whether a voice uttered by the user corresponds to a voice command included in the correspondence table shown in FIG. 2. When the control unit 2 determines that the voice uttered by the user corresponds to one of the voice commands, such as "right," included in the correspondence table, the control unit 2 moves the display position of the icon 21 on the indication screen 23 to the right side by predetermined pixels (FIG. 4B), for example.

Alternatively, when the control unit 2 determines that the voice uttered by the user corresponds to one of the voice commands, such as "large," included in the correspondence table (FIG. 2), the control unit 2 enlarges the display size of the icon 21 on the indication screen 23 by predetermined pixels (FIG. 4C), for example. Alternatively, when the control unit 2 determines that the voice uttered by the user corresponds to one of the voice commands, such as "dark," included in the correspondence table (FIG. 2), the control unit 2 modifies the icon 21 to be darker on the indication screen 23 by predetermined tones (FIG. 4D), for example. In FIG. 4D, the hatching indicates the darkened tone of the icon 21. Alternatively, when the control unit 2 determines that the voice uttered by the user corresponds to one of the voice commands, such as "erase," included in the correspondence table (FIG. 2), the control unit 2 erases the icon 21 (FIG. 4E), for example. As described above, an operation when a user modifies the display mode of the icon 21 was explained. It is noted that when a user modifies the display mode of the icon 22, the control unit 2 modifies the display mode of the icon 22 similarly to the icon 21.

As described above, according to the present embodiment, the in-vehicle navigation device 1 determines whether the vehicle is traveling; whether the microphone 15 receives a voice uttered by a user; whether the voice recognition unit 11 recognizes the voice received by the microphone 15; and whether the recognized voice corresponds to a voice command beforehand stored in the correspondence table. When the in-vehicle navigation device 1 determines that all the conditions are satisfied, the in-vehicle navigation device 1 performs a display mode modification operation beforehand stored corresponding to the voice command so as to modify the display mode of the icon. Thereby, when a user utters a voice corresponding to the voice command, the display mode of the icon can be modified without spoiling safety even when the vehicle is traveling.

The present invention is not limited to the embodiment, and may be transformed or extended as follows.

The in-vehicle device is not limited to an in-vehicle navigation device. It suffices that the in-vehicle device has a function to indicate an icon corresponding to a gadget and a function to perform voice recognition of a voice uttered by a user The icon may be any one of a static image, indicated content of which is not updated, and a dynamic image, indicated content of which can be updated. The dynamic image may be an image indicating a program function of a clock, for example.

For example, the voice command may be "next screen" to move the display position of an icon on the indication screen to the subsequent screen, "return" to return a display mode of an icon to an immediately preceding state, and/or the like. The voice command may be a complex voice command of, for example, "enlarge after moving rightward" to move rightward the display position of an icon on the indication screen, thereafter to enlarge the display size of the icon. The voice command may be capable of specifying a movement degree, an enlargement rate, a contraction rate, and/or the like. For example, the voice command may be "rightward by X centimeters" to move the display position of an icon on the indication screen rightward by X centimeters. Alternatively, the voice command may be "enlarge by X percent" to enlarge the display size of an icon on the indication screen by X percent.

A user may be enabled to register a correspondence between a voice command and a display mode modification operation.

When the in-vehicle navigation device 1 is activated and supplied with electric power, the voice recognition unit 11 may be regularly activated. Alternatively, the voice recognition unit 11 may be activated when a user manipulates a PTT switch, and the voice recognition unit 11 may be deactivated after a predetermined time period subsequent to manipulation of the PTT switch by a user to deactivate the voice recognition unit 11.

A user may utter a specific voice, and the in-vehicle navigation device 1 may determine whether the uttered voice is to activate a gadget of whether the uttered voice is to modify a display mode of an icon.

In the above embodiment, a gadget is received from a server through a wide area network, and a display mode of an icon corresponding to the gadget is modified. It is noted that the gadget is not limited to one received from a server through a wide area network. A gadget may be transferred from an external storage medium such as a USB memory when the external storage medium is equipped to the in-vehicle navigation device 1. Thus, a display mode of an icon corresponding to the gadget transferred from the external storage medium may be modified.

In the above embodiment, it is determined whether the vehicle is traveling according to a vehicle speed signal. It is noted that it may be determined whether the vehicle is traveling according to at least one or a combination of the vehicle speed signal, a distance signal outputted from a distance sensor, an accelerator position signal outputted from an accelerator sensor and representing a throttle position of an accelerator device, and the like.

Summarizing the above embodiments, when determining that a vehicle equipped with the self device is traveling according to a traveling state of the vehicle obtained by a traveling state acquisition unit and when a voice uttered by a user and received by a voice input unit is recognized by a voice recognition unit and determined to correspond to a voice command stored in a storage unit, a control unit modifies a display mode of an icon currently indicated on an indication screen of an indication unit correspondingly to the voice command, according to a display mode modification operation stored in the storage unit.

In this way, even when the vehicle is traveling, a user can modify the display mode of the icon currently indicated on the indication screen of the indication unit by uttering a voice corresponding to a voice command according to the display mode modification operation stored corresponding to the voice command, without necessity of moving an eye sight from the traveling direction toward an operation key or gazing at the indication screen. Thus, a display mode of an icon can be modified without spoiling safety.

When determining that a vehicle equipped with the self device is traveling according to a traveling state of the vehicle obtained by a traveling state acquisition unit, when determining that an operation receiving unit receives a display mode modification operation, and when a voice uttered by a user and received by a voice input unit is recognized by a voice recognition unit and determined to correspond to a voice command stored in a storage unit, a control unit modifies a display mode of an icon currently indicated on an indication screen of an indication unit correspondingly to the voice command, according to a display mode modification operation stored in the storage unit.

In this way, a user performs a display mode modification operation, and thereafter, the user utters a voice corresponding to a voice command, thereby the display mode of the icon currently indicated on the indication screen of the indication unit can be modified according to the display mode modification operation stored corresponding to the voice command. In this case, a user can modify the display mode of the icon by performing a display mode modification operation, with an intention to modify the display mode of the icon.

When determining that a vehicle equipped with the self device is traveling according to a traveling state of the vehicle obtained by a traveling state acquisition unit, when determining that an operation receiving unit receives a display mode modification operation different from a gadget start operation, and when a voice uttered by a user and received by a voice input unit is recognized by a voice recognition unit and determined to correspond to a voice command stored in a storage unit, a control unit modifies a display mode of an icon currently indicated on an indication screen of an indication unit correspondingly to the voice command, according to a display mode modification operation stored in the storage unit.

In this way, a user can start a gadget by performing a gadget start operation. Alternatively, a user may perform a display mode modification operation different from the gadget start operation, and thereafter, the user may utter a voice corresponding to a voice command. Thereby, the display mode of the icon currently indicated on the indication screen of the indication unit can be modified according to the display mode modification operation stored corresponding to the voice command.

An operation receiving unit is configured to receive an operation as a display mode modification operation by a user to select an icon and modify a display mode of the selected icon. When determining that a vehicle equipped with the self device is traveling according to a traveling state of the vehicle obtained by a traveling state acquisition unit, when determining that an operation receiving unit receives a display mode modification operation, and when a voice uttered by a user and received by a voice input unit is recognized by a voice recognition unit and determined to correspond to a voice command stored in a storage unit, a control unit modifies a display mode of the icon selected by the user from the icons currently indicated on an indication screen of an indication unit, correspondingly to the voice command, according to a display mode modification operation stored in the storage unit. In this way, a user can modify the display mode of the icon, which is selected by the user, by performing an operation to select the icon.

The control unit is configured to set the voice recognition unit into a state in which the voice recognition unit is capable of voice recognition when determining that the operation receiving unit receives the display mode modification operation. In this way, a user can set the voice recognition unit into the state in which the voice recognition unit is capable of voice recognition at a suitable time point when voice recognition is required, by performing the display mode modification operation. Thus, the user can operate the voice recognition unit efficiently.

The control unit is configured to modify the display mode of the icon currently indicated on the indication screen of the indication unit by modifying the display position of the icon on the indication screen. Specifically, a user can move the display position of the icon on the indication screen in four directions by uttering a voice such as "upward," "downward," "leftward," or "rightward" to modify the display position of the icon on the indication screen.

The control unit is configured to modify the display mode of the icon currently indicated on the indication screen of the indication unit by modifying a display size of the icon on the indication screen. Specifically, a user can increase or decrease the display size of the icon on the indication screen by uttering a voice such as "enlarge" or "contract" to modify the display size of the icon on the indication screen.

The control unit is configured to modify the display mode of the icon currently indicated on the indication screen of the indication unit by modifying a contrast of the icon on the indication screen. Specifically, a user can darken or lighten the indication of the icon on the indication screen by uttering a voice such as "darken" or "lighten" to modify the contrast of the icon on the indication screen.

The control unit is configured to modify the display mode of the icon currently indicated on the indication screen of the indication unit by modifying permission (prohibition) of indication of the icon corresponding to the gadget on the indication screen. Specifically, a user can erase or indicate the icon on the indication screen by uttering a voice such as "erase" or "indicate" to modify permission (prohibition) of indication of the icon corresponding to the gadget on the indication screen.

The above structures of the embodiments can be combined as appropriate.

The above processings such as calculations and determinations are not limited being executed by the control unit 2. The control unit may have various structures including the control unit 2 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An in-vehicle device configured to be equipped to a vehicle, the in-vehicle device comprising:
    an indication unit having an indication screen and configured to indicate an icon which corresponds to a gadget, on the indication screen to function as an operation receiving unit configured to receive a gadget start operation performed by a user;
    a traveling state acquisition unit configured to obtain a traveling state of the vehicle;
    a voice input unit configured to receive a voice uttered by a user;
    a voice recognition unit configured to recognize a voice uttered by a user and received by the voice input unit;
    a storage unit configured to store a correspondence between a voice command and a display mode modification operation; and
    a control unit configured to perform a display mode modification operation, which is stored in the storage unit and corresponding to a voice command to modify a display mode of an icon indicated on the indication screen when all of the following occur:
        i) the control unit determines that the vehicle is traveling, according to a traveling state of the vehicle obtained by the traveling state acquisition unit,
        ii) the voice recognition unit recognizes a voice, which is uttered by a user and received by the voice input unit; and
        iii) the control unit determines that the recognized voice corresponds to the voice command stored in the storage unit,
    the control unit is further configured to select the icon as an object for which the display mode is to be modified according to the operation of the user to the icon, and activate the voice recognition unit for a predetermined period to determine whether the recognized voice corresponds to the voice command for the display mode modification operation included in the correspondence table, when the control unit determines that the vehicle is traveling and that the operation is performed by the user to the icon and that the operation of the user to the icon is the display mode modification operation.

2. The in-vehicle device according to claim 1, wherein the operation receiving unit is further configured to receive an operation of a user as a display mode modification operation to modify a display mode of an icon,
    wherein the control unit is configured to perform a display mode modification operation, which is stored in the storage unit and corresponding to a voice command to modify a display mode of an icon indicated on the indication screen when all of the following occur:
        i) the control unit determines that the vehicle is traveling, according to a traveling state of the vehicle obtained by the traveling state acquisition unit;
        ii) the control unit determines that the operation receiving unit receives a display mode modification operation;
        iii) the voice recognition unit recognizes a voice, which is uttered by a user and received by the voice input unit; and
        iv) the control unit determines that the recognized voice corresponds to the voice command stored in the storage unit.

3. The in-vehicle device according to claim 2,
    wherein the control unit is configured to perform a display mode modification operation, which is stored in the storage unit and corresponding to a voice command to modify a display mode of an icon indicated on the indication screen when all of the following occur:
        i) the control unit determines that the vehicle is traveling, according to a traveling state of the vehicle obtained by the traveling state acquisition unit;
        ii) the control unit determines that the operation receiving unit receives a display mode modification operation different from a gadget start operation;
        iii) the voice recognition unit recognizes a voice, which is uttered by a user and received by the voice input unit; and
        iv) the control unit determines that the recognized voice corresponds to the voice command stored in the storage unit.

4. The in-vehicle device according to claim 2,
    wherein the operation receiving unit is configured to receive a display mode modification operation performed by a user to modify a display mode of an icon selected from icons by a user,
    wherein the control unit is configured to perform a display mode modification operation, which is stored in the storage unit and corresponding to a voice command to modify a display mode of an icon selected by a user from icons indicated on the indication screen when all of the following occur:
i) the control unit determines that the vehicle is traveling, according to a traveling state of the vehicle obtained by a traveling state acquisition unit;
ii) the control unit determines that an operation receiving unit receives a display mode modification operation different from the gadget start operation;
iii) the voice recognition unit recognizes a voice, which is uttered by a user and received by the voice input unit; and
iv) the control unit determines that the recognized voice corresponds to the voice command stored in the storage unit.

5. The in-vehicle device according to claim 2, wherein the control unit is configured to enable the voice recognition unit to recognize a voice when the control unit determines that the operation receiving unit receives a display mode modification operation.

6. The in-vehicle device according to claim 1, wherein the control unit is configured to modify a display mode of an icon indicated on the indication screen by modifying a display position of an icon on the indication screen.

7. The in-vehicle device according to claim 1, wherein the control unit is configured to modify a display mode of an icon indicated on the indication screen by modifying a display size of an icon on the indication screen.

8. The in-vehicle device according to claim 1, wherein the control unit is configured to modify a display mode of an icon indicated on the indication screen by modifying a contrast of an icon on the indication screen.

9. The in-vehicle device according to claim 1, wherein the control unit is configured to modify a display mode of an icon indicated on the indication screen by modifying permission of indication of an icon corresponding to a gadget on the indication screen.

10. The in-vehicle device according to claim 1, wherein the icon represents the gadget, and
the gadget is a program configured to enable a user to access a frequently used software tool.

11. The in-vehicle device according to claim 1, wherein the operation receiving unit is configured to function as a touch key to receive a touch operation as the gadget start operation performed by a user on an icon.

12. A method for modifying a display mode of an icon corresponding to a gadget indicated on an indication screen, the method comprising:
obtaining a traveling state of a vehicle;
receiving a voice uttered by a user using a voice input unit;
recognizing a voice received by the voice input unit using a voice recognition unit;
first determining whether the vehicle is traveling according to the obtained traveling state of the vehicle;
second determining whether the voice recognition unit recognizes a voice received by the voice input unit;
third determining whether the recognized voice corresponds to a voice command stored in a storage unit;
performing a display mode modification operation, which is stored in the storage unit to correspond to the voice command, to modify a display mode of an icon indicated on the indication screen when all the first determining, the second determining, and the third determining make positive; determinations; and
receiving a gadget start operation performed by a user on the icon, which the display mode modified,
selecting the icon as an object for which the display mode is to be modified according to the operation of the user to the icon, and activating the voice recognition unit for a predetermined period to determine whether the recognized voice corresponds to the voice command for the display mode modification operation included in the correspondence table, when the vehicle is determined to be traveling and the operation is determined to be performed by the user to the icon and the operation of the user to the icon is determined to be the display mode modification operation.

13. The method according to claim 12, wherein
the icon represents the gadget, and
the gadget is a program configured to enable a user to access a frequently used software tool.

14. The method according to claim 12, wherein the receiving further including
receiving a touch operation as the gadget start operation performed by a user on the icon, which the display mode has modified.

15. A non-transitory computer readable medium comprising instructions executed by a computer, the instructions including the method according to claim 12.

16. An in-vehicle device configured to be equipped to a vehicle, the in-vehicle device comprising:
an indication unit having an indication screen and configured to indicate an icon which corresponds to a gadget, on the indication screen to function as an operation receiving unit configured to receive a gadget start operation performed by a user;
a traveling state acquisition unit configured to obtain a traveling state of the vehicle;
a voice input unit configured to receive a voice uttered by a user;
a voice recognition unit configured to recognize a voice uttered by a user and received by the voice input unit;
a storage unit configured to store a correspondence between a voice command and a display mode modification operation; and
a control unit configured to perform a display mode modification operation, which is stored in the storage unit and corresponding to a voice command to modify a display mode of an icon indicated on the indication screen when all of the following occur:
i) the control unit determines that the vehicle is traveling, according to a traveling state of the vehicle obtained by the traveling state acquisition unit,
ii) the voice recognition unit recognizes a voice, which is uttered by a user and received by the voice input unit; and
iii) the control unit determines that the recognized voice corresponds to the voice command stored in the storage unit,
wherein the control unit is further configured to
determine whether the indication unit receives an operation performed by the user to the icon which corresponds to the gadget;
determine whether the operation of the user to the icon is the gadget start operation or the display mode modification operation on the icon;
perform the gadget start operation or the display mode modification operation on the icon, according to the operation of the user to the icon, when the control unit determines that the vehicle is not traveling and that the operation is performed by the user to the icon;
perform the gadget start operation according to the operation of the user to the icon, when the control unit determines that the vehicle is traveling and that the operation is performed by the user to the icon and that the operation of the user to the icon is not the display mode modification operation;

select the icon as an object for which the display mode is to be modified according to the operation of the user to the icon, and activate the voice recognition unit for a predetermined period to determine whether the recognized voice corresponds to the voice command for the display mode modification operation included in the correspondence table, when the control unit determines that the vehicle is traveling and that the operation is performed by the user to the icon and that the operation of the user to the icon is the display mode modification operation.

17. The in-vehicle device according to claim 16, wherein the operation performed by the user is a user touch to the icon which corresponds to the gadget, the operation performed by the user and received by the indication unit is a user touch to the icon which corresponds to the gadget.

18. A method for modifying a display mode of an icon corresponding to a gadget indicated on an indication screen, the method comprising:

obtaining a traveling state of a vehicle;

receiving a voice uttered by a user using a voice input unit;

recognizing a voice received by the voice input unit using a voice recognition unit;

first determining whether the vehicle is traveling according to the obtained traveling state of the vehicle;

second determining whether the voice recognition unit recognizes a voice received by the voice input unit;

third determining whether the recognized voice corresponds to a voice command stored in a storage unit;

performing a display mode modification operation, which is stored in the storage unit to correspond to the voice command, to modify a display mode of an icon indicated on the indication screen when all the first determining, the second determining, and the third determining make positive; determinations;

receiving a gadget start operation performed by a user on the icon, which the display mode modified;

determining whether the indication screen receives an operation performed by the user to the icon which corresponds to the gadget;

determining whether the operation of the user to the icon is the gadget start operation or the display mode modification operation on the icon;

performing the gadget start operation or the display mode modification operation on the icon, according to the operation of the user to the icon, when the vehicle is determined to be not traveling and the operation is determined to be performed by the user to the icon;

performing the gadget start operation according to the operation of the user to the icon, when the vehicle is determined to be traveling and the operation is determined to be performed by the user to the icon and the operation of the user to the icon is determined to be not the display mode modification operation; and selecting the icon as an object for which the display mode is to be modified according to the operation of the user to the icon, and activating the voice recognition unit for a predetermined period to determine whether the recognized voice corresponds to the voice command for the display mode modification operation included in the correspondence table, when the vehicle is determined to be traveling and the operation is determined to be performed by the user to the icon and the operation of the user to the icon is determined to be the display mode modification operation.

19. The method according to claim 18, wherein the operation performed by the user is a user touch to the icon which corresponds to the gadget, the operation performed by the user and received by the indication unit is a user touch to the icon which corresponds to the gadget.

* * * * *